United States Patent
Liang et al.

(10) Patent No.: US 10,200,502 B2
(45) Date of Patent: Feb. 5, 2019

(54) METHOD AND APPARATUS FOR SOFTWARE UPDATE MANAGEMENT

(71) Applicant: GUANGZHOU UCWEB COMPUTER TECHNOLOGY CO., LTD., Guangzhou (CN)

(72) Inventors: Jie Liang, Guangzhou (CN); Xiaozhi Sun, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 109 days.

(21) Appl. No.: 14/981,268

(22) Filed: Dec. 28, 2015

(65) Prior Publication Data

US 2016/0188316 A1 Jun. 30, 2016

(30) Foreign Application Priority Data

Dec. 31, 2014 (CN) .......................... 2014 1 0857272

(51) Int. Cl.
*H04L 29/08* (2006.01)
*G06F 8/658* (2018.01)

(52) U.S. Cl.
CPC .............. *H04L 67/34* (2013.01); *G06F 8/658* (2018.02)

(58) Field of Classification Search
None
See application file for complete search history.

(56) References Cited

U.S. PATENT DOCUMENTS

| | | | |
|---|---|---|---|
| 2008/0301670 A1* | 12/2008 | Gouge .............. | G06F 17/30867 717/173 |
| 2014/0304697 A1* | 10/2014 | Lin .......................... | G06F 8/68 717/170 |
| 2015/0143352 A1* | 5/2015 | Tokumoto ................ | G06F 8/65 717/169 |
| 2015/0277898 A1* | 10/2015 | Deng ....................... | G06F 8/65 717/171 |

* cited by examiner

*Primary Examiner* — Wynuel S Aquino
(74) *Attorney, Agent, or Firm* — Sheppard Mullin Richter & Hampton LLP (57) ABSTRACT

A method for software update management is described. The method comprises: comparing sub-files of a plurality of variants of a software program to generate difference information including a list of uncommon sub-files among the plurality of variants; generating one or more increment files based on the difference information and files of a target version of the software program; and transmitting the one or more increment files to a device, wherein the transmission enables the device to merge the one or more increment files with files of one of the plurality of variants to generate files of the target version of the software program.

17 Claims, 7 Drawing Sheets

METHOD AND APPARATUS FOR SOFTWARE UPDATE MANAGEMENT

CROSS-REFERENCE TO RELATED APPLICATION

This application is based upon and claims priority to Chinese Patent Application No. 201410857272.3, filed Dec. 31, 2014, the entire contents of which are incorporated herein by reference.

TECHNICAL FIELD

The present disclosure generally relates to the field of data processing technology and, more particularly, to a method and an apparatus for software update management.

BACKGROUND

Software update generally includes a modification to, or addition/deletion of, one or more files of a software program. The software update can be performed to, for example, fix bugs of a particular version of the software program, to add or remove a functionality, to improve a property of the software program, etc. One method to carry out software update is carrying out incremental update. Using such a method, a software update provider device (e.g., a server) can compare between a particular version (to be updated) of application program files and a target version of the files, and generate one or more increment files that record difference information between the files. A device on which the software update is to be performed (e.g., a client device) can then download the increment files, merge the increment files with the corresponding files at the client device, to generate the target version of the files. The software update can then be completed by, for example, using the newly generated files for an installation process. With such an arrangement, there is no need to download the entirety of the target version of the files. As a result, less data traffic is produced, while the software update can be completed in a shorter time, thereby improving efficiency.

However, the efficiency of such a method can be affected by other factors. For example, for the same files of the same version of a software program, the content of such files can be different when distributed by different distribution channels. As an illustrative example, for an installation program of a UC Browser™ (http://www.ucweb.com/ucbrowser/), there may exist a file named "x" in a version 1.0 file of APK1a distributed by the GooglePlay™, while version 1.0 file of APK1b distributed by the Baidu™ mobile phone assistant does not include a file "x." As another example, both version 1.0 files of APK1c and APK1a distributed by the UCWeb™ app store have file named "y," but the file "y" in APK1c and the file "y" in APK1a may have different contents. In addition, the applicability of an increment file to a software program file can be specific to a distribution channel. For example, if it is intended to perform increment update on a version 1.0 file of the UC Browser to become a file of APK2 version 2.0, the installation process may require comparing APK2 with each of APK1a, APK1b and APK1c to obtain, respectfully, increment files CLa, CLb, and CLc. Therefore, to update a file, the existing increment upgrading method needs the generator of increment files (e.g., a server) to respectively compare a version of the file at various distribution channels with a target version of the corresponding file to be used for installation, in order to obtain the corresponding increment file.

Typically, there are many distribution channels for an application program, and an increment file associated with a distribution channel may not be reused for software updates associated with a different distribution channel. By requiring each software update process to include comparing different variants of program files (albeit associated with the same version) against the target version, the efficiency of the update process will be affected. Moreover, to store different sets of increment files associated with various distribution channels for various versions of a program file, a large amount of storage space is required.

SUMMARY

As discussed above, a current method of conducting software update, which includes comparing different variants of program files of a particular version, each variant provided by a different distribution channel, against the target version during the software update process, and generating the corresponding increment files, is inefficient, and uses a large amount of storage space. An objective of the present disclosure is to provide a method and an apparatus for software update management, to solve the aforementioned problems.

The present disclosure provides a method for managing software update. The method comprises: comparing sub-files of a plurality of variants of a software program to generate difference information including a list of uncommon sub-files among the plurality of variants, generating one or more increment files based on the difference information and files of a target version of the software program, and transmitting the one or more increment files to a device, wherein the transmission enables the device to merge the one or more increment files with files of one of the variants to generate files of the target version of the software program.

In some embodiments, each of the plurality of variants is associated with a particular version and with a distribution channel.

In some embodiments, the generation of the one or more increment files comprises: determining, for each of sub-files of the target version of the software program, whether a sub-file of the target version of the software program is included in the list of uncommon sub-files, and responsive to determining that a first sub-file of the target version of the software program is included in the list of uncommon sub-files, including information related to the first sub-file in the one or more increment files.

In some embodiments, the method further comprises: comparing the sub-files associated with the plurality of variants to generate similarity information including a list of common sub-files among the plurality of variants. The generation of the one or more increment files can further comprises: responsive to determining that a second sub-file of the target version of the software program is not included in the list of uncommon sub-files, determining whether the second sub-file is included in the list of common sub-files.

In some embodiments, the generation of the one or more increment files further comprises: responsive to determining that a second sub-file is included in the list of common sub-files: determining first information representing one or more differences between the target version of the second sub-file and a corresponding common sub-file; and including the first information in the increment files.

In some embodiments, the generation of the one or more increment files further comprises: responsive to determining that a second sub-file is not included in the list of common sub-files, including information related to the second sub-file in the increment files. The information related to the second sub-file can include content of the second sub-file.

In some embodiments, the generation of the one or more increment files comprises: responsive to determining that a second sub-file of the target version of the software program is not included in the list of uncommon sub-files, determining whether the second sub-file is included in any one of the plurality of variants, responsive to determining that the second sub-file is included in one of the plurality of variants: determining second information representing one or more differences between the target version of the second sub-file and a corresponding sub-file included in the one of the plurality of variants, and including the second information in the increment files, responsive to determining that the second sub-file is not included in any one of the plurality of variants: including information related to the second sub-file in the increment files. The information related to the second sub-file can include content of the second sub-file.

The present disclosure provides an apparatus and a non-transitory computer-readable medium that stores instructions that, when executed by one or more hardware processors, can cause the one or more hardware processors to perform the aforementioned method.

Using the techniques of the present disclosure, to generate a set of increment files for updating a software program file, a software program provider device (e.g., a server) can first compare between data associated with different variants of the program files, all of which associated with a particular version but provided by different distribution channels, to obtain information about differences (if any) between these files. A set of increment files can then be generated based on the differences information, and a target version of the software program files. The set of increment files can then be transmitted to a device (e.g., a client device) to perform an update to the software program. The client device can then use that set of increment files to update the particular version of a program file to become the target version, regardless of which distribution channel that program file is from. Accordingly, the same set of increment files can be reused for software updates associated with different distribution channels. Since there is no need to pre-store different sets of increment files associated with various distribution channels, and that there is also no need to compare, on-the-fly, between different variants of the software program and the target version to generate the increment files during the software update process, the software update process can be performed more efficiently and with less storage space.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

As discussed above, under current technology, a current method of conducting software update, which includes comparing different variants of program files of a particular version, each variant provided by a different distribution channel, against the target version during the software update process, and generating the corresponding increment files, is inefficient, and uses large amount of storage space. An objective of the present disclosure is to provide a method and an apparatus for software update management, to solve the aforementioned problems.

Reference will now be made in detail to methods and specific implementations that seek to overcome the foregoing shortcomings of current systems and methods. According to embodiments of the present disclosure, to generate a set of increment files for updating a software program file, a software program provider device (e.g., a server) can first compare between data associated with a particular version (to be updated to a target version) of the program files stored at different distribution channels, to obtain information about differences (if any) between these files. A set of increment files that correspond to the differences can then be transmitted to a device (e.g., a client device) to perform an update to the software program. The client device can then use that set of increment files to update the particular version of the program file to the target version regardless of which distribution channel that program file is from. Accordingly, the same set of increment files can be reused for software updates associated with different distribution channels. Since there is no need to pre-store different set of increment files corresponding to various distribution channels, and that there is also no need to generate, on-the-fly, increment files during the software update process, the software update process can be performed more efficiently and with less storage space.

Examples of these implementations are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
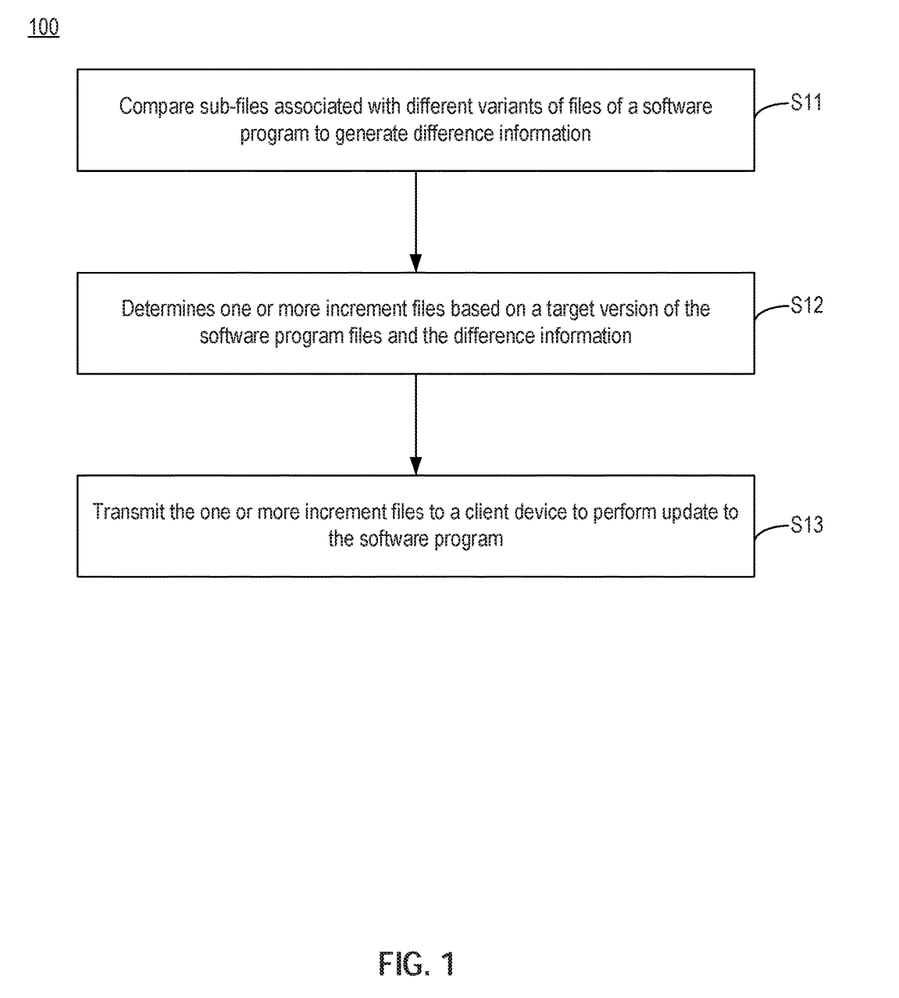
FIG. 1 is a flow chart illustrating a method for software update management, consistent with embodiments of the present disclosure.

Reference is now made to FIG. 1, which illustrates an exemplary method 100 for software update management. The method can be performed at a software update provider device (e.g., a server). Referring to FIG. 1, method 100 includes the following steps.

In step S11, the server compares sub-files associated with different variants of files of a software program to generate difference information.

In some embodiments, the different variants of the software program files can refer to software program files of a particular version (to be updated to a target version) but distributed by different distribution channels. In this case, the server, in order to generate the increment files, can compare software program files of the same version but distributed by different distribution channels, and generate difference information. For example, as shown below in Table 1, there are three variants of version 2.0 of UC Browser™ program files, named "UCbrowser_2a," "UCbrowser_2b," and "UCbrowser_2c," each of which includes a set of sub-files:

TABLE 1

| Name | Sub-files |
| --- | --- |
| UCbrowser_2a | X, Y, Z |
| UCbrowser_2b | X, Y, W |
| UCbrowser_2c | X, Y', Z |

Based on the comparison in step S11, the content of sub-file "Y'" of "UCbrowser_2c" program files is different from the content of sub-file "Y" of "UCbrowser_2a" and "UCbrowser_2b" program files. The program files of both of "UCbrowser_2a" and "UCbrowser_2c" include a sub-file "Z," while the program files of "UCbrowser_2b" does not include such a file. Moreover, the program files of "UCbrowser_2b" includes a sub-file "W" which is not included in the program files of either "UCbrowser_2a" or "UCbrowser_2c." In such a case, the server can execute step S11 to generate difference information CL_2 that includes a list of sub-files that are not common among all three variants of version 2.0 of UC Browser™ program files: Y, Y', Z, and W. Similarly, the server can also execute step S11 to generate difference information CL_1 that includes a list of sub-files that are not common among all variants of version 1.0 of UC Browser™ program files.

In step S12, the server determines one or more increment files based on a target version of the software program files and the difference information. In some cases, the server can execute steps S11 and S12 to generate increment files for a software update, after receiving a request from another device (e.g., a client device) to perform the software update. In some cases, the server can first execute steps S11 and S12 to prepare the increment files for future software update requests.

As an illustrative example, assuming that there is a software update to UC Browser™ version 3.0, which can include three variants for three different distribution channels: "UCbrowser_3a," "UCbrowser_3b," and "UCbrowser_3c." For each of these three target variants, the server can generate a set of increment files. For example, the server can generate, based on difference information CL_2 and the file information of "UCbrowser_3a," increment file(s) P_2×3a that can be used to update any variant of version 2.0 of UC Browser™ program files (e.g., "UCbrowser_2a," "UCbrowser_2b," or "UCbrowser_2c") to "UCbrowser_3a." Likewise, the server can also generate, based on different information CL_1 and the file information of "UCbrowser_3a," increment file(s) P_1×3a that can be used to update any variant of version 1.0 of UC Browser™ program files to "UCbrowser_3a." Moreover, the server can generate increment file(s) P_2×3b that can be used to update any variant of version 2.0 of UC Browser™ program files to "UCbrowser_3b." That is, the increment files can be version-specific (e.g., associated with a particular version to be updated, and a target version), and can also be specific to a target version distributed by a specific distribution channel. However, the increment files can also be used to update program files of that particular version distributed by different distribution channels.

In step S13, the server transmits the one or more increment files, determined in step S12, to a client device to perform update to the software program.

For example, the client device, after receiving the increment files, can perform the software update by first merging that particular version of software program files stored at the client device with the increment files to generate the target version of the software program files, and then executing the generated program files to complete the update process. As discussed before, the increment files can also be used to update program files of that particular version distributed by different distribution channels. Therefore, the increment files can be used as long as the program files stored at the client device is of that particular version. For example, the client device may be installed with any of the variants "UCbrowser_2a," "UCbrowser_2b," and "UCbrowser_2c," and the client device can use the increment file(s) P_2×3a to update any of these to a target version "UCbrowser_3a." Accordingly, the increment files can also be used to update program files of that particular version, regardless of which distribution channel that particular version is associated with.

With embodiments of the present disclosure, the server can compare files (including sub-files) associated with different variants of a software program to generate difference information. The different variants can be software program files of a particular version but distributed by different distribution channels. The server can then generate increment files based on the difference information and a target version of the software program files, and transmit the increment files to a client device, on which the particular version of the program files are installed. The increment files are applicable to that particular version of the program files, regardless of which distribution channel the program files are associated with. Accordingly, the same set of increment files can be reused for software updates associated with different distribution channels. Since there is no need to pre-store different set of increment files corresponding to various distribution channels, and that there is also no need to generate, on-the-fly, increment files during the software update process, the software update process can be performed more efficiently and with less storage space.

Figure 2:
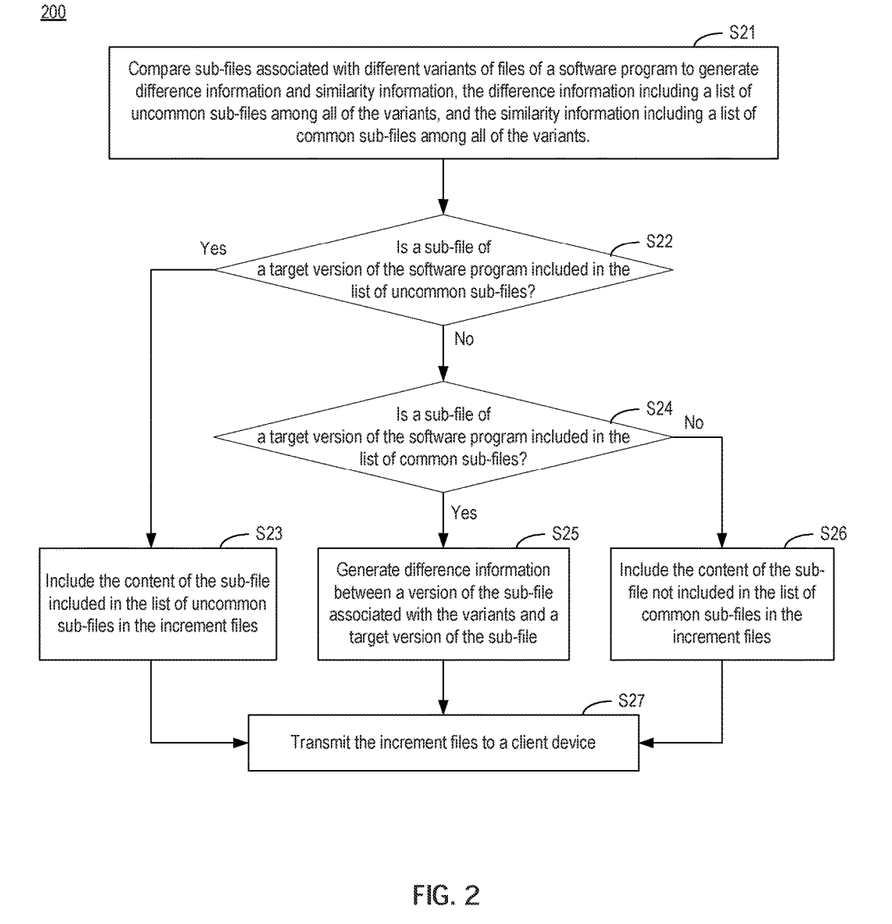
FIG. 2 is a flow chart illustrating a method for software update management, consistent with embodiments of the present disclosure.

Reference is now made to FIG. 2, which illustrates an exemplary method 200 for software update management. The method can be performed at a software update provider device (e.g., a server). Referring to FIG. 2, method 200 includes the following steps.

In step S21, the server compares the sub-files associated with different variants of files of a software program to generate difference information and similarity information. The difference information can include a list of uncommon sub-files among all of the variants, while the similarity information can include a list of common sub-files among all of the variants.

In some embodiments, the different variants of the software program files can refer to software program files of a particular version (to be updated to a target version) but distributed by different distribution channels. The sub-files associated with these variants of the software program files can then be categorized. For example, referring back to Table 1, sub-file "X" is common among all of the variants "UCbrowser_2a," "UCbrowser_2b," and "UCbrowser_2c," and can be included in the list of common sub-files among the variants. Likewise, sub-files Y, Y', Z, and W can be included in the list of uncommon sub-files among the variants.

version of the software program files, and then executing the generated program files to complete the update process.

By executing the steps S22 to S26, the server can generate increment files between a particular version of a software program and a target version of the software program based on a list of common sub-files among variants of the particular version of the software program, a list of uncommon sub-files among the variants, and the files of the target version of the software program. Specifically, the server determines whether each of the sub-files of the target version is listed in either the list of common sub-files or the list of uncommon sub-files, and generates the increment files accordingly. Table 2 provides a summary of the operations of the server for each sub-file of the target version:

TABLE 2

| Scenario | List of uncommon sub-files | List of common sub-files | Operation to the sub-file of the target version |
|---|---|---|---|
| 1 | The sub-file is included | The sub-file is or is not included | Include information related to the sub-file of the target version in the increment files |
| 2 | The sub-file is not included | The sub-file is included | Generate difference information between the particular version and the target version of the sub-file, and include the difference information in the increment files |
| 3 | The sub-file is not included | The sub-file is not included | Include information related to the sub-file of the target version in the increment files |

In step S22, the server determines, for each of the sub-files of a target version of the software program, whether the sub-file is included in the list of uncommon sub-files. For a first sub-file of the software program listed in the list of uncommon sub-files, the server can proceed to execute step S23. For a second sub-file of the software program that is not listed in the list of uncommon sub-files, the server can proceed to execute step S24.

In step S23, the server includes the information related to the first sub-file (e.g., content) in one or more increment files, and then proceeds to execute step S27.

In step S24, the server determines whether the second sub-file (not included in the list of uncommon sub-files) is included in the list of common sub-files. If the second sub-file is included in the list of common sub-files, the server proceeds to execute step S25. Otherwise, the server proceeds to execute step S26.

In step S25, the server generates first information representing one or more differences between the particular version of the second sub-file associated with the variants and the target version of the second sub-file, and includes the first information in the increment files.

In step S26, where the second sub-file is not included in the list of common sub-files (as determined in step S24), the server includes the information related to the second sub-file (e.g. content) in the increment files.

In step S27, if all of the sub-files of the target version of the software program have been analyzed according to steps S22-S26, the server can transmit the increment files to another device (e.g. a client device) to perform the software update.

For example, the client device, after receiving the increment files, can perform the software update by first merging that particular version of software program files stored at the client device with the increment files to generate the target As an illustrative example, the target version of the software program includes a sub-file named "sample." According to Table 2, the generation of the increment files corresponding to the sub-file "sample" can be according to one of the following three scenarios:

Scenario 1: The list of uncommon sub-files includes a sub-file named "sample," as determined in step S22. This can indicate that at least one variant of the particular version of the software program files (e.g., associated with one of the distribution channels) does not include the sub-file "sample." In this case, the server can execute step S23 to include information related to the sub-file "sample" (e.g., content) in the increment files.

Scenario 2: The list of uncommon sub-files does not include a sub-file named "sample," but the list of common sub-files include such a sub-file, as determined in steps S22 and S24. This can indicate that all variants of the particular version of the software program files (e.g., associated with all of the distribution channels) include the file "sample." In this case, the server can execute step S25 to determine first information about one or more differences between the particular version of the sub-file "sample" and the target version of the sub-file "sample," and include the first information in the increment files.

Scenario 3: If neither the list of uncommon sub-files nor the list of common sub-files includes a sub-file named "sample," as determined in steps S22 and S24, it can indicate that the sub-file "sample" is specific to the target version. Therefore, the server can execute step S26 to include information related to the sub-file "sample" (e.g., content) in the increment files.

Moreover, the client device can also perform a merge operation as follows: The client device can store information related to a target version sub-file (generated from steps S23 or S26, such as content) included in the increment file at a pre-determined region. For difference information between different versions of the sub-file (generated from step S25), the client device can locate the corresponding sub-file (of the particular version), merge it with the difference information to form the target version, and store the target version of the sub-file at the pre-determined region. After the client device completes processing the increment files, the files stored at the pre-determined region can then be used (e.g., being executed as part of the installation process) to complete the software update.

With embodiments of the present disclosure, the server can compare files (including sub-files) associated with different variants of a software program to generate a list of common sub-files and uncommon sub-files among the variants. The different variants can be software program files of a particular version but distributed by different distribution channels. The server can then generate increment files for each sub-file of the target version of the software program based on three scenarios. In the first scenario, if the sub-file is included in the list of uncommon sub-files, information related to the sub-file (e.g., content) can be included in the increment files. In the second scenario, if the sub-file is included in the list of common sub-files, the server can determine first information about one or more differences between the particular version and the target version of the sub-file, and include the first information in the increment files. In the third scenario, if the sub-file is neither included in the list of common sub-files nor included in the list of uncommon sub-files, information related to the sub-file (e.g., content) is also included in the increment files. The increment files can then be transmitted to the client device. The client device can then use the increment files to update the particular version of software program, regardless of which distribution channel the program is associated with. Accordingly, the same set of increment files can be reused for software updates associated with different distribution channels. Since there is no need to pre-store different set of increment files corresponding to various distribution channels, and that there is also no need to compare, on-the-fly, different variants of the software program to be updated and the target version to generate increment files during the software update process, the software update process can be performed more efficiently and with less storage space.

Figure 3:
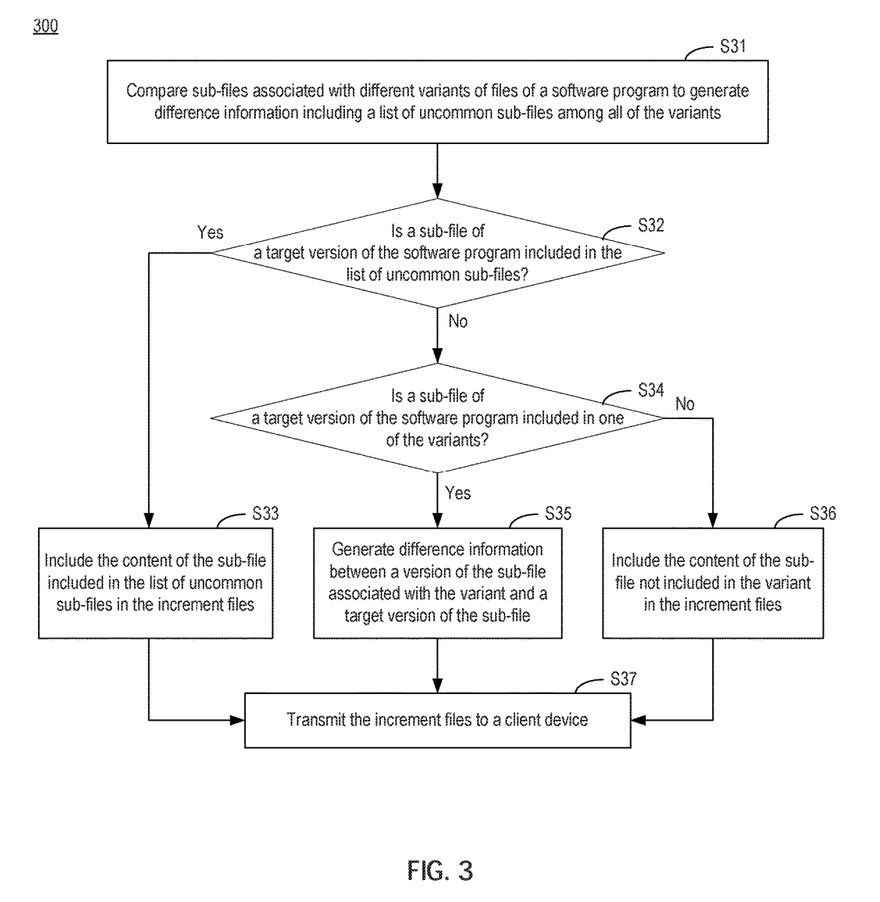
FIG. 3 is a flow chart illustrating a method for software update management, consistent with embodiments of the present disclosure.

Reference is now made to FIG. 3, which illustrates an exemplary method 300 for software update management. The method can be performed at a software update provider device (e.g., a server). Referring to FIG. 3, method 300 includes the following steps.

In Step S31, the server compares the sub-files associated with different variants of files of a software program to generate a list of uncommon sub-files among all of the variants.

In some embodiments, the different variants of the software program files can refer to software program files of a particular version (to be updated to a target version) but distributed by different distribution channels. The sub-files associated with these variants of the software program files can then be categorized. For example, referring back to Table 1, sub-file "X" is common among all of the variants "UCbrowser_2a," "UCbrowser_2b," and "UCbrowser_2c," and can be included in a list of common sub-files among the variants. Likewise, sub-files Y, Y', Z, and W can be included in the list of uncommon sub-files among the variants.

In step S32, the server determines, for each of the sub-files of a target version of the software program, whether the sub-file is included in the list of uncommon sub-files. For a first sub-file of the software program listed in the list of uncommon sub-files, the server can proceed to execute step S33. For a second sub-file of the software program that is not listed in the list of uncommon sub-files, the server can proceed to execute step S34.

In step S33, the server includes the information related to the first sub-file (e.g., content) in one or more increment files, and then proceeds to execute step S37.

In step S34, the server determines whether the second sub-file (not included in the list of uncommon sub-files) is included in one of the variants of the software program files. If the second sub-file is included in one of the variants of the software program files (e.g., the particular version of the software program files distributed by one of the different distribution channels), which can indicate that the second sub-file corresponds to a common sub-file among the variants, the server can proceed to execute step S35. Otherwise, the server can proceed to execute step S36. In step S34, the server can pick any one of the variants of the software program files to search for the second sub-file.

In step S35, the server generates second information representing one or more differences between the target version of the second sub-file and the corresponding common sub-file, and includes the second information in the increment files.

In step S36, where the second sub-file is not included in one of the variants of the software program files (as determined in step S34), the server includes information related to the second sub-file (e.g., content) in the increment files.

In step S37, if all of the sub-files of the target version of the software program have been analyzed according to steps S32-S36, the server can transmit the increment files to another device (e.g. a client device) to perform the software update.

For example, the client device, after receiving the increment files, can perform the software update by first merging that particular version of software program files stored at the client device with the increment files to generate the target version of the software program files, and then executing the generated program files to complete the update process.

With embodiments of the present disclosure, after determining that a sub-file of a target version of the software program is not included in the list of uncommon sub-files among the variants, the server can then determine whether the sub-file is included in any of the variants. For example, when generating increment files to support a software update from version 2.0 of UC Browser™ program files to a target version "UCbrowser_3a," the server can compare a sub-file of "UCbrowser_3a" against any one of "UCbrowser_2a," "UCbrowser_2b," and "UCbrowser_2c." After searching for the sub-file in the list of uncommon sub-files and determining that the sub-file is not included, the server only needs to further search for that sub-file in a list of common sub-files among the variants. Since each variant includes these common sub-files, it is sufficient to search for the sub-file in the files of any one of the variants.

Therefore, the generation of increment files in methods 200 and 300 are based on similar principles. Based on the list of uncommon sub-files and a comparison with a particular version of the software program files, a sub-file of a target version of the software program can be grouped into one of three categories, and increment files can be generated based on the category. Accordingly, the same set of increment files can be reused for software updates associated with different distribution channels. Since there is no need to pre-store different set of increment files corresponding to various distribution channels, and that there is also no need to compare, on-the-fly, different variants of the software program to be updated and the target version to generate increment files during the software update process, the software update process can be performed more efficiently and with less storage space.

Figure 4:
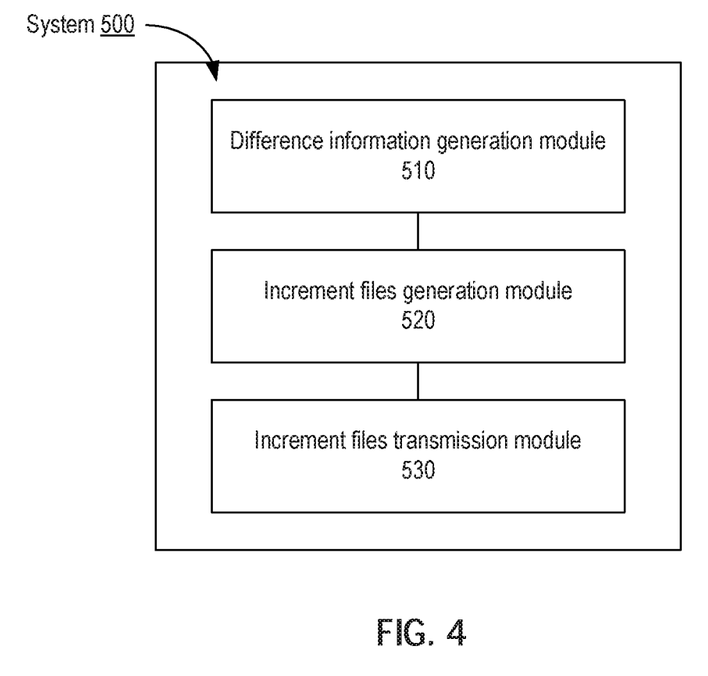
FIG. 4 is a schematic diagram illustrating a software update provider device for performing software update management, consistent with embodiments of the present disclosure.

FIG. 4 is a schematic diagram illustrating an exemplary system 500 for software update management, consistent with embodiments of the present disclosure. In some embodiments, various components of system 500 can perform one or more steps of methods 100, 200, and 300 of FIGS. 1-3. As shown in FIG. 4, system 500 includes difference information generation module 510, an increment files generation module 520, and an increment files transmission module 530.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices (e.g., a processor) can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Referring back to FIG. 4, difference information generation module 510 is configured to compare sub-files associated with different variants of files of a software program to generate difference information. In some embodiments, the different variants of the software program files can refer to software program files of a particular version (to be updated to a target version) but distributed by different distribution channels. Difference information generation module 510 can be configured to perform, for example, at least part of step S11 of method 100 of FIG. 1.

Increment files generation module 520 is configured to determine one or more increment files based on a target version of the software program files and the difference information. Increment files generation module 520 can be configured to perform, for example, at least part of step S12 of method 100.

Increment files transmission module 530 is configured to transmit the one or more increment files to a client device to perform update to the software program. Increment files transmission module 530 can be configured to perform, for example, at least part of step S13 of method 100.

Figure 5:
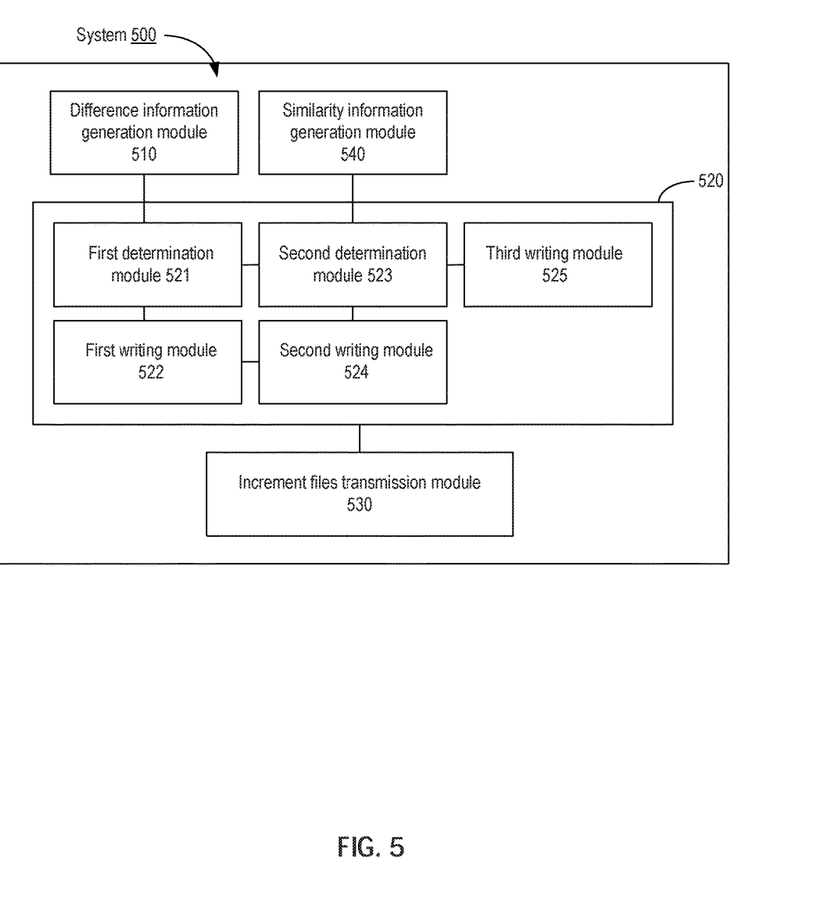
FIG. 5 is a schematic diagram illustrating a software update provider device for performing software update management, consistent with embodiments of the present disclosure.

FIG. 5 is a schematic diagram illustrating one embodiment of exemplary system 500 for software update management, consistent with embodiments of the present disclosure. As shown in FIG. 5, system 500 can include, besides difference information generation module 510 and increment files transmission module 530, a similarity information generation module 540 as well. Also, increment files generation module 520 can include a first determination module 521, a second determination module 523, a first writing module 522, a second writing module 524, and a third writing module 525.

Difference information generation module 510 is configured to compare sub-files associated with different variants of files of a software program to generate difference information. In some embodiments, the different variants of the software program files can refer to software program files of a particular version (to be updated to a target version) but distributed by different distribution channels. The difference information can include a list of uncommon sub-files among the variants. Difference information generation module 510 can be configured to perform, for example, at least part of step S21 of method 200 of FIG. 2.

Similarity information generation module 540 is configured to compare sub-files associated with different variants of files of a software program to generate similarity information. The similarity information can include a list of common sub-files among the variants. Similarity information generation module 540 can be configured to perform, for example, at least part of step S21 of method 200 of FIG. 2.

First determination module 521 is configured to determine, for each of the sub-files of a target version of the software program, whether the sub-file is included in the list of uncommon sub-files. For a first sub-file of the software program listed in the list of uncommon sub-files, first determination module 521 can trigger an operation at first writing module 522. For a second sub-file of the software program that is not listed in the list of uncommon sub-files, first determination module 521 can trigger an operation at second determination module 523. First determination module 521 can be configured to perform, for example, at least part of step S22 of method 200.

First writing module 522 is configured to include information related to the first sub-file (e.g., content) in one or more increment files. First writing module 522 can be configured to perform, for example, at least part of step S23 of method 200.

Second determination module 523 is configured to determine whether the second sub-file (not included in the list of uncommon sub-files) is included in the list of common sub-files. If the second sub-file is included in the list of common sub-files, second determination module 523 can trigger an operation at second writing module 524, otherwise it can trigger an operation at third writing module 525. Second determination module 523 can be configured to perform, for example, at least part of step S24 of method 200.

Second writing module 524 is configured to generate first information representing one or more differences between the particular version of the second sub-file associated with the variants and the target version of the second sub-file, and to include the first information in the increment files. Second writing module 524 can be configured to perform, for example, at least part of step S25 of method 200.

Third writing module 525 is configured to include information related to the second sub-file (e.g., content) in the increment files, when the second sub-file is not included in the list of common sub-files, as determined by second determination module 523. Third writing module 525 can be configured to perform, for example, at least part of step S26 of method 200.

Increment files transmission module 530 is configured to transmit the increment files to a client device to perform update to the software program, after all of the sub-files of the target version of the software program have been analyzed by first determination module 521 and second determination module 523. Increment files transmission module 530 can be configured to perform, for example, at least part of step S27 of method 200.

Figure 6:
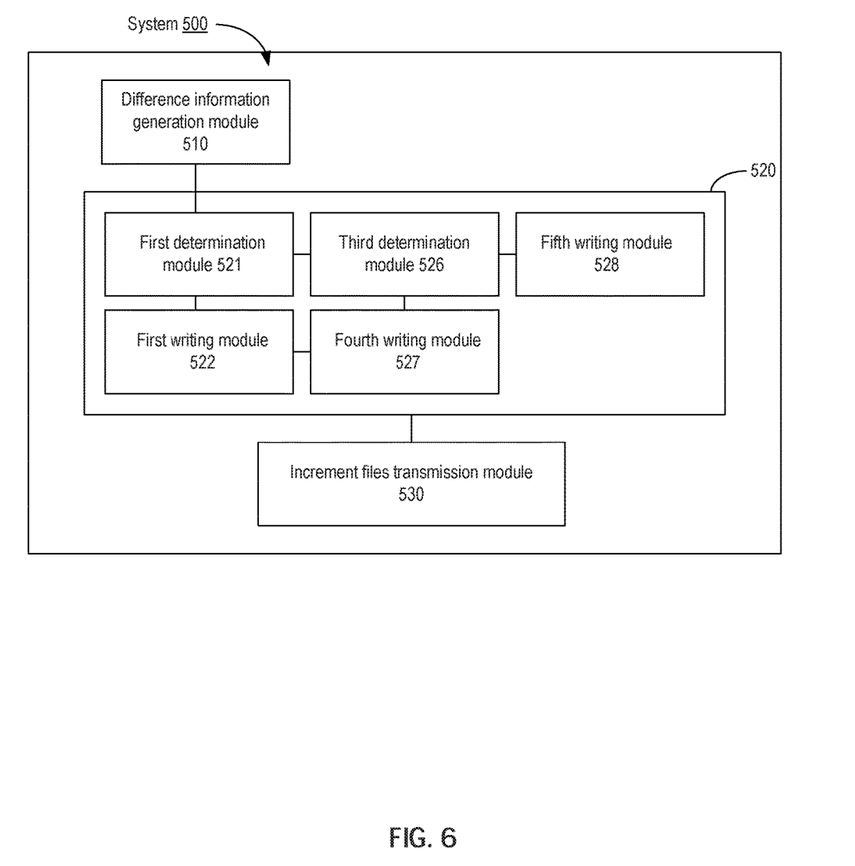
FIG. 6 is a schematic diagram illustrating a software update provider device for performing software update management, consistent with embodiments of the present disclosure.

FIG. 6 is a schematic diagram illustrating one embodiment of exemplary system 500 for software update management, consistent with embodiments of the present disclosure. As shown in FIG. 6, increment files generation module 520 of system 500 can include first determination module 521, third determination module 526, first writing module 522, a fourth writing module 527, and a fifth writing module 528.

Difference information generation module 510 is configured to compare sub-files associated with different variants of files of a software program to generate difference information. In some embodiments, the different variants of the software program files can refer to software program files of a particular version (to be updated to a target version) but distributed by different distribution channels. The difference information can include a list of uncommon sub-files among the variants. Difference information generation module 510 can be configured to perform, for example, at least part of step S31 of method 300 of FIG. 3.

First determination module 521 is configured to determine, for each of the sub-files of a target version of the software program, whether the sub-file is included in the list of uncommon sub-files. For a first sub-file of the software program listed in the list of uncommon sub-files, first determination module 521 can trigger an operation at first writing module 522. For a second sub-file of the software program that is not listed in the list of uncommon sub-files, first determination module 521 can trigger an operation at third determination module 526. First determination module 521 can be configured to perform, for example, at least part of step S32 of method 300.

First writing module 522 is configured to include information related to the first sub-file (e.g., content) in one or more increment files. First writing module 522 can be configured to perform, for example, at least part of step S33 of method 300.

Third determination module 526 is configured to determine whether the second sub-file (not included in the list of uncommon sub-files) is included in one of the variants of the software program files. If the second sub-file is included in one of the variants of the software program files (e.g., the particular version of the software program files distributed by one of the different distribution channels), which can indicate that the second sub-file corresponds to a common sub-file among the variants, third determination module 526 can trigger an operation at fourth writing module 527. Otherwise, third determination module 526 can trigger an operation at fifth writing module 528. Third determination module 526 can be configured to perform, for example, at least part of step S34 of method 300, and can pick any one of the variants of the software program files to search for the second sub-file.

Fourth writing module 527 is configured to generate second information representing one or more differences between the target version of the second sub-file and the corresponding common sub-file. Fourth writing module 527 can be configured to perform, for example, at least part of step S35 of method 300.

Fifth writing module 528 is configured include information related to the second sub-file (e.g., content) in the increment files, if the second sub-file is not included in one of the variants of the software program files, as determined by third determination module 526. Fifth writing module 528 can be configured to perform, for example, at least part of step S36 of method 300.

Increment files transmission module 530 is configured to transmit the increment files to a client device to perform update to the software program, after all of the sub-files of the target version of the software program have been analyzed by first determination module 521 and third determination module 526. Increment files transmission module 530 can be configured to perform, for example, at least part of step S37 of method 300.

Figure 7:
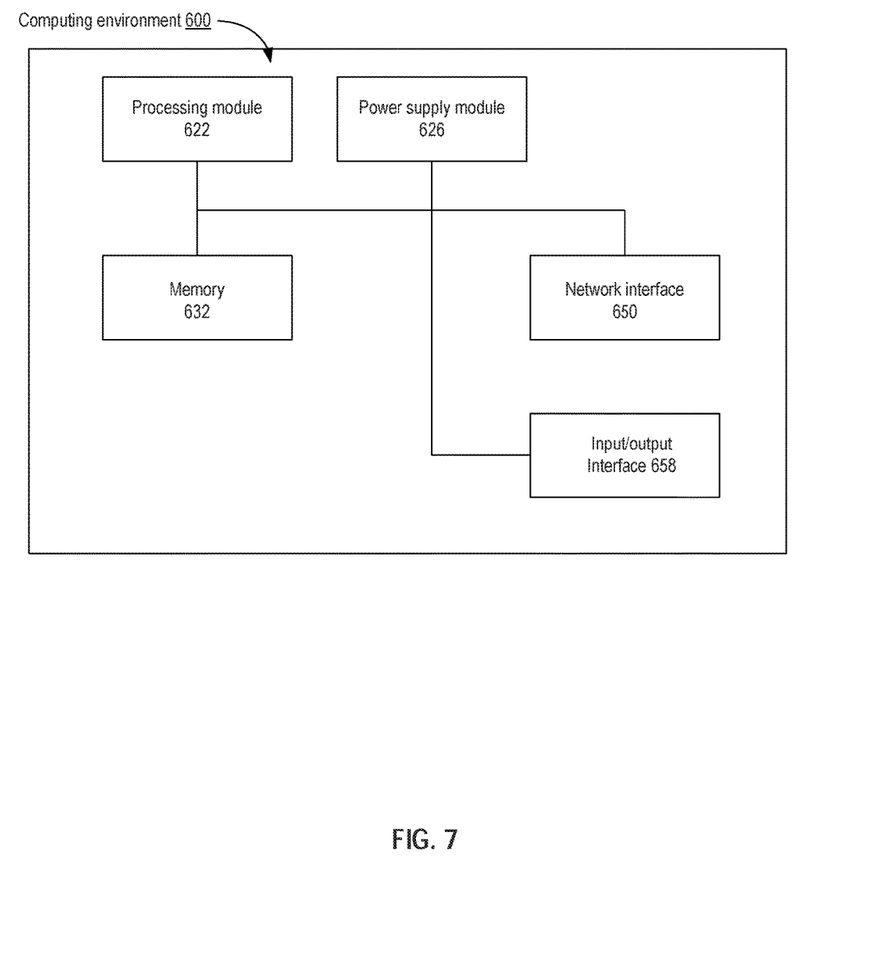
FIG. 7 is a schematic diagram illustrating a computing environment in which a software update provider device can be implemented, consistent with embodiments of the present disclosure.

FIG. 7 is a schematic diagram illustrating a computing environment 600 in which a software update provider device (e.g. system 500 of FIGS. 4-6) can be implemented. As shown in FIG. 7, computing environment 600 includes a processing module 622, which further includes one or more processors, and memory 632 configured to store instructions (e.g., an application program) which can be executed by processing module 622. The application program stored in the memory 632 may include one or more modules, each of which can be associated with a group of instructions. In some embodiments, the processing component 622 can also be configured to execute the instructions to execute methods for software update management as described in FIGS. 1-3.

Computing environment 600 can further include a power supply module 626 configured to execute a power supply management for computing environment 600, a wired or wireless network interface 650 configured to connect the computing environment 600 to the network, and an input/output (I/O) interface 658. Computing environment 600 may operate an operating system stored in the memory 632, for example, Windows Server™, Mac OS X™, Unix™, Linux™, FreeBSD™, or the like.

With embodiments of the present disclosure, to generate a set of increment files for updating a software program file, a software program provider device (e.g., a server) can first compare between data associated with different variants of a particular version (to be updated to a target version) of the program files stored at different distribution channels, to obtain information about differences (if any) between these files. A set of increment files can be generated based on the differences and the target version of the program files, and the increment files can then be transmitted to a device (e.g., a client device) to perform an update to the software program. The client device can then use that set of increment files to update the particular version of the program file to the target version regardless of which distribution channel that program file is from. Accordingly, the same set of increment files can be reused for software updates associated with different distribution channels. Since there is no need to pre-store different set of increment files corresponding to various distribution channels, and that there is also no need to generate, on-the-fly, increment files during the software update process, the software update process can be performed more efficiently and with less storage space.

As will be understood by those skilled in the art, embodiments of the present disclosure may be embodied as a method, a system or a computer program product.

Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer available storage media (including but not limited to a magnetic disk memory, a CD-ROM, an optical memory and so on) containing computer available program codes.

Embodiments of the present disclosure are described with reference to flow diagrams and/or block diagrams of methods, devices (systems) and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams.

In a typical configuration, a computer device includes one or more Central Processing Units (CPUs), an input/output interface, a network interface and a memory.

The memory may include forms of a volatile memory, a random access memory (RAM) and/or non-volatile memory and the like, such as a read-only memory (ROM) or a flash RAM in a computer readable medium. The memory is an example of the computer readable medium.

The computer readable storage medium refers to any type of physical memory on which information or data readable by a processor may be stored. Thus, a computer readable storage medium may store instructions for execution by one or more processors, including instructions for causing the processor(s) to perform steps or stages consistent with the embodiments described herein. The computer readable medium includes non-volatile and volatile media, removable and non-removable media, wherein information storage can be implemented with any method or technology. Information may be modules of computer readable instructions, data structures and programs or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transmission media which may be used to store information capable of being accessed by a computer device. The computer readable medium is non-transitory, and does not include transitory media, such as modulated data signals and carrier waves.

If the embodiments are implemented by software, the software may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

It will be further noted that the terms "comprises", "comprising" or any other variations are intended to cover non-exclusive inclusions, so as to cause a process, method, commodity or device comprising a series of elements to not only comprise those elements, but also comprise other elements that are not listed specifically, or also comprise elements that are inherent in this process, method, commodity or device. Therefore, the element defined by a sentence "comprising a . . . " does not preclude the presence of other same elements in the process, method, commodity or device including said elements under the condition of no more limitations.

Other embodiments of the present disclosure will be apparent to those skilled in the art from consideration of the specification disclosed here. This application is intended to cover any variations, uses, or adaptations of embodiments of the present disclosure following the general principles thereof and including such departures from the present disclosure as come within known or customary practice in the art. It is intended that the specification and examples be considered as exemplary only.

What is claimed is:

1. A method for managing software update, comprising:
    comparing sub-files of a plurality of variants of a software program of a previous version that have been distributed through a plurality of distribution channels respectively;
    generating difference information including a list of uncommon sub-files among the plurality of variants, wherein each of the variants comprises one or more of the sub-files and the uncommon sub-files are sub-files not commonly comprised in all of the plurality of variants;
    generating one or more increment files based on the difference information and sub-files of an updated version of the software program, wherein the one or more increment files include:
    i) information on first one or more of the sub-files of the updated version, when corresponding first one or more of the sub-files of the previous version are included in the list of uncommon sub-files;
    ii) difference information of second one or more of the sub-files of the updated version of the software program and corresponding second one or more of the sub-files of the previous version, when the corresponding second one or more of the sub-files of the previous version are not included in the list of uncommon sub-files; and iii) information on third one or more of the sub-files of the updated version, when corresponding third one or more of the sub-files of the previous version do not exist in the plurality of variants;

transmitting, from a server, the one or more increment files to a device;

merging, by the device, the transmitted one or more increment files with sub-files of one of the plurality of variants of the software program of the previous version and generating sub-files of the updated version of the software program based on the merging.

2. The method of claim 1, wherein the information on the first one or more of the sub-files of the updated version includes content of the first one or more of the sub-files of the updated version, and the information on the third one or more of the sub-files of the updated version includes content of the third one or more of the sub-files of the updated version.

3. The method of claim 1, further comprising generating similarity information including a list of common sub-files among the plurality of variants, wherein the common sub-files are sub-files commonly comprised in all of the plurality of variants.

4. The method of claim 1, further comprising receiving a request to perform a software update from the device, after the comparing the sub-files of the plurality of variants of the software program of the previous version.

5. The method of claim 1, further comprising receiving a request to perform a software update from the device, wherein the comparing sub-files of the plurality of variants of the software program of the previous version is carried out in response to the request.

6. The method of claim 1, wherein the one or more increment files are commonly applicable to the plurality of distribution channels.

7. A system for software update management, comprising:
a device associated with a client; and
a server comprising:
 a memory device that stores instructions; and
 at least one hardware processor configured to execute the instructions to:
 compare sub-files of a plurality of variants of a software program of a previous version that have been distributed through a plurality of distribution channels respectively;
 generate difference information including a list of uncommon sub-files among the plurality of variants wherein each of the variants comprises one or more of the sub-files and the uncommon sub-files are sub-files not commonly comprised in all of the plurality of variants;
 generate one or more increment files based on the difference information and sub-files of an updated version of the software program, wherein the one or more increment files include:
 i) information on first one or more of the sub-files of the updated version, when corresponding first one or more of the sub-files of the previous version are included in the list of uncommon sub-files;
 ii) difference information of second one or more of the sub-files of the updated version of the software program and corresponding second one or more of the sub-files of the previous version, when the corresponding second one or more of the sub-files of the previous version are not included in the list of uncommon sub-files; and
 iii) information on third one or more of the sub-files of the updated version, when corresponding third one or more of the sub-files of the previous version do not exist in the plurality of variants; and
 transmit the one or more increment files to the device, wherein the device is configured to merge the transmitted one or more increment files with sub-files of one of the plurality of variants of the software program of the previous version and generate sub-files of the updated version of the software program based on the merge.

8. The system of claim 7, wherein the information on the first one or more of the sub-files of the updated version includes content of the first one or more of the sub-files of the updated version, and the information on the third one or more of the sub-files of the updated version includes content of the third one or more of the sub-files of the updated version.

9. The system of claim 7, wherein the at least one hardware processor is configured to execute the instructions to generate similarity information including a list of common sub-files among the plurality of variants, wherein the common sub-files are sub-files commonly comprised in all of the plurality of variants.

10. The system of claim 7, wherein the at least one hardware processor is further configured to execute the instructions to receive a request to perform a software update from the device after comparing the sub-files of the plurality of variants of the software program of the previous version.

11. The system of claim 7, wherein the at least one hardware processor is further configured to execute the instructions to receive a request to perform a software update from the device and compare the sub-files of the plurality of variants of the software program of the previous version in response to the request.

12. The system of claim 7, wherein the one or more increment files are commonly applicable to the plurality of distribution channels.

13. A non-transitory readable medium that stores one or more programs that, when executed by one or more processors of a server and a device associated with a client, causes the one or more processors to perform a method for managing software update, the method comprising:
 comparing sub-files of a plurality of variants of a software program of a previous version that have been distributed through a plurality of distribution channels respectively;
 generating difference information including a list of uncommon sub-files among the plurality of variants, wherein each of the variants comprises one or more of the sub-files and the uncommon sub-files are sub-files not commonly comprised in all of the plurality of variants;
 generating one or more increment files based on the difference information and sub-files of an updated version of the software program, wherein the one or more increment files include:
 i) information on first one or more of the sub-files of the updated version, when corresponding first one or more of the sub-files of the previous version are included in the list of uncommon sub-files;

ii) difference information of second one or more of the sub-files of the updated version of the software program and corresponding second one or more of the sub-files of the previous version, when the corresponding second one or more of the sub-files of the previous version are not included in the list of uncommon sub-files; and iii) information on third one or more of the sub-files of the updated version, when corresponding third one or more of the sub-files of the previous version do not exist in the plurality of variants; and transmitting, from the server, the one or more increment files to the device;

merging, by the device, the transmitted one or more increment files with sub-files of one of the plurality of variants of the software program of the previous version; and generating sub-files of the updated version of the software program based on the merging.

14. The non-transitory readable medium of claim 13, wherein the method further comprises generating similarity information including a list of common sub-files among the plurality of variants, wherein the common sub-files are sub-files commonly comprised in all of the plurality of variants.

15. The non-transitory readable medium of claim 13, wherein the method further comprises receiving a request to perform a software update from the device, after the comparing the sub-files of the plurality of variants of the software program of the previous version.

16. The non-transitory readable medium of claim 13, wherein the method further comprises receiving a request to perform a software update from the device, wherein the comparing sub-files of the plurality of variants of the software program of the previous version is carried out in response to the request.

17. The non-transitory readable medium of claim 13, wherein the one or more increment files are commonly applicable to the plurality of distribution channels.

* * * * *